Figure 1:
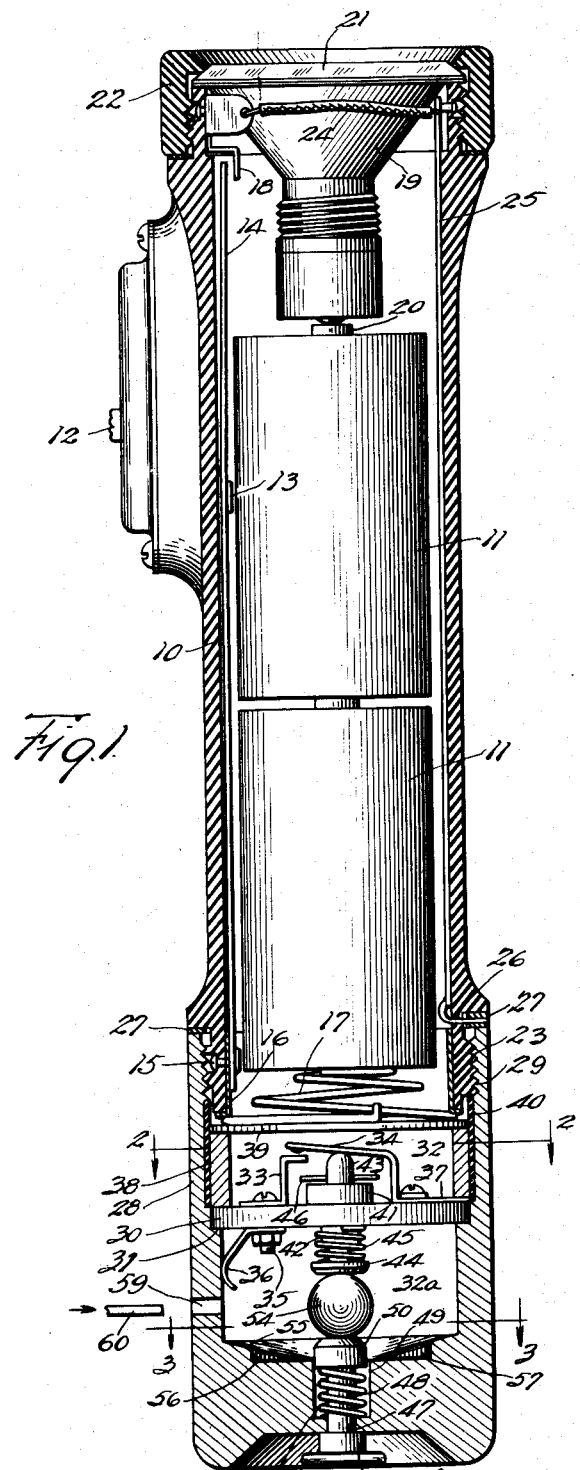

Oct. 17, 1950 W. C. MENTZER ET AL 2,525,820
INERTIA RESPONSIVE CONTROL DEVICE
Filed Oct. 22, 1947

Inventors
William C. Mentzer
Gordon G. Anderson
By Thiess, Olson & Mecklenburger Attys Patented Oct. 17, 1950

2,525,820

UNITED STATES PATENT OFFICE 2,525,820

INERTIA RESPONSIVE CONTROL DEVICE

William C. Mentzer, Western Springs, and Gordon G. Anderson, Chicago, Ill., assignors to United Air Lines, Inc., Chicago, Ill., a corporation of Delaware Application October 22, 1947, Serial No. 781,448

3 Claims. (Cl. 200—52)

This invention relates to inertia responsive control devices; more particularly to inertia responsive switch means for controlling the energizing circuit of a flashlight or similar device; and the invention has for an object the provision of an improved and inexpensive inertia responsive device of this character.

Inertia controlled flashlights of the type heretofore known have not been entirely satisfactory due to the expensive and complicated constructions employed and to lack of dependability in the operation thereof, and it is a further object of this invention to provide an inertia responsive control means that may be applied to a standard flashlight without substantial modification thereof, that consists only of a few rugged parts which are not liable to get out of order, which may be readily constructed and assembled, and which will insure reliable operation under severe treatment.

Although devices embodying the present invention are not limited in their application, they are particularly designed for use in vehicles such, for example, as commercial aircraft for providing adequate lighting of the interior of the vehicle in the event of an accident. Flashlights provided with control devices embodying this invention are capable of manual operation in the normal fashion, the inertia responsive device providing for automatic operation of the flashlight under certain conditions independently of the manual control. It is contemplated in one application of the invention that one or more flashlights provided with the improved inertia responsive control means will be located, say, in the passenger cabin of an aircraft by means of resilient clamps on the wall of the cabin, the flashlight being supported in a substantially vertical position with the bulb end thereof directed toward the ceiling. Normally the flashlight will be deenergized and may be readily removed from its clamp for normal usage, if desired. In the event, however, that the aircraft meets with an accident, such for example as to require a forced landing, involving a sufficiently severe shock to damage the normal lighting system, the inertia responsive means incorporated in the flashlight will operate to turn on the flashlight and thus illuminate the cabin, thus preventing the panic that might occur if the accident took place at night and the passengers were left in complete darkness. Other applications of flashlights embodying the present invention may, of course, be made, the flashlight being capable of the normal uses while at the same time providing for automatic illumination under specified conditions.

In carrying out the invention in one form, a standard flashlight of the type having a hollow body for containing one or more dry cell batteries, and having manually operable switch means for selectively making and breaking the lighting circuit from the battery, is provided with an inertia control device comprising a casing which is threaded at one end for securement to the open end of the flashlight body in place of the usual end cap. Extending across the casing intermediate its ends is a wall which serves to divide the casing into two compartments, in one of which are positioned suitable contact means that are connected in parallel circuit relation with the manual switch means of the flashlight. Extending through the dividing wall in the casing and slidable therein is an operating member which is movable between two positions to open and close the contacts. The end of the operating member which extends into the compartment other than the one containing the contacts, engages an inertia element or ball which is supported on a suitable abutment member disposed in alignment with the path of movement of the operating member. The operating member and the abutment member are biased for movement toward each other, and the body is normally retained therebetween by the force of the biasing means, the operating member with the ball in this position being restrained in a position to open the contacts in the other compartment. When the flashlight is subjected to a shock of sufficient magnitude, the inertia of the ball will cause it to move outwardly from between the abutment member and the operating member, whereupon the biasing means for the operating member causes movement thereof to close the contacts and automatically turn on the flashlight. The abutment member which extends through the end wall of the casing may be manually moved to a withdrawn position, the inside surface of the end wall of the casing being tapered so that the ball, when the abutment member is withdrawn, automatically centers itself over the abutment member whereupon the return of the abutment member to its normal position repositions the ball between the abutment member and the operating member and returns the operating member to its position in which the contacts are open.

Figure 2:
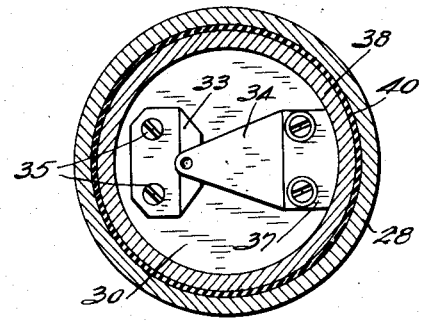
Figure 3:
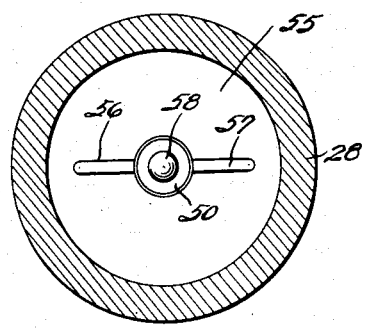

For a more complete understanding of the invention, reference should now be had to the drawing, in which:

Figure 1 is a longitudinal sectional view taken substantially along the axis of a flashlight provided with inertia control means embodying the invention, certain parts being shown in elevation more clearly to illustrate the construction; and Figs. 2 and 3 are transverse sectional views respectively taken along the lines 2—2 and 3—3 of Fig. 1.

Referring now to the drawing, the invention is shown as applied to a standard flashlight of a type readily available on the market, which flashlight comprises a hollow tubular body portion 10 for containing a pair of dry cell batteries 11, the casing 10 in this particular type of flashlight being formed of suitable molded insulation material. As shown, the flashlight is provided with manually operable switch means, including a handle 12 adapted to move to operate a finger 13, which in turn effects movement of a suitable contact or bus bar 14. One end of the bus bar 14 is secured by a suitable rivet 15 to a metal sleeve 16 disposed within the flashlight at the lower end thereof, and the electrical circuit from the bus bar 14 to the outer shell of the lower one of the dry cell batteries 11 is completed in the usual fashion through the sleeve 16 and the battery pressing spring 17. Adapted to be engaged by the movable end of the bus bar 14 is a stationary contact 18, a portion of which is engaged by the reflector 19 to complete the electrical circuit to the shell of the light bulb socket, the center contact of the light bulb completing its energizing circuit by engagement with the center contact 20 of the upper dry cell battery 11. The reflector 19 and the usual lens 21 of the flashlight are held in position on the body portion 10 by the usual screw cap 22. The flashlight as thus far described is of well-known construction, the spring 17 ordinarily being positioned by means of a screw cap adapted to engage the threads 23 on the lower end of the flashlight body.

In accordance with the present invention the standard flashlight is modified by the provision of an additional circuit in parallel with the contacts 14 and 18, and adapted to be controlled by the inertia responsive means about to be described. This additional circuit, as shown in Fig. 1, consists of a conductor 24 which extends from a portion of the contact 18 to the upper end of a second bus bar 25 which is suitably supported within the flashlight body, the lower end of the bus bar 25 being electrically connected by means of a short conductor 26 to a ring 27 which surrounds the flashlight body 10 and is held in position by means of a metal casing 28 having suitable threads 29 for engaging the threaded end of the flashlight body 10.

Supported within the casing intermediate the ends thereof is a wall 30 which is formed of insulating material and is adapted to rest on a suitable annular shoulder 31 formed in the wall of the casing 28. As shown, the wall 30 divides the casing 28 into a pair of compartments 32 and 32a, which respectively contain suitable circuit-controlling contact means and the inertia responsive means which comprise the present invention. Thus the wall 30 supports within the compartment 32 a pair of relatively movable contacts 33 and 34, the stationary contact 33 being electrically connected by means of suitable screws 35 and a spring finger 36 to the metal wall of the casing 28. As shown, the movable contact 34 includes a suitable extension 37 arranged to engage a spacing ring 38 which is formed of conducting material and which supports a disk 39 formed of similar material on which the battery pressing spring 17 is adapted to rest. Surrounding the spacing ring 38 and the disk 39 is a sleeve 40 which is formed of insulating material and serves to insulate the movable contact 34, the spacing ring 38, and the disk 39 from the metal casing 28.

It will thus be seen that the lighting circuit controlled by the inertia responsive device extends from the stationary contact 18 of the flashlight through the conductor 24, the bus bar 25, the casing 28 which engages the ring 27, and by way of the spring finger 36 and the screws 35 to the stationary contact 33 which is mounted on the insulating wall 30. From the stationary contact 33, the circuit extends through the movable contact 34, the extension 37, the spacing ring 38, and the disk 39 to the spring 17, which, as previously described, is connected to the movable contact or bus bar 14 of the flashlight whereby the contacts 33 and 34 are connected in parallel circuit relation to the contacts 14 and 18. Consequently, closure of the energizing circuit of the flashlight may be accomplished either through manual operation of the handle 12 or through operation of the contacts 33 and 34 to a closed circuit position.

As shown in Fig. 1, the insulating wall 30 is provided on opposite sides thereof with suitable collars 41 and 42, which are provided with a suitable aperture (not shown) for slidably receiving an operating or control member in the form of a pin 43, the upper end of which is adapted to engage the movable contact 34 to operate this contact between open and closed circuit positions. The end of the operating member 43 which extends into the compartment 32a is provided with an enlarged head 44, and a suitable spring 45 disposed between the head 44 and the wall 30 serves to bias the operating member 43 for movement downwardly into the compartment 32a to permit closure of the contacts 33 and 34. Adjacent its upper end, the pin 43 is provided with a transversely extending cross pin 46 which engages the collar 41, thereby to limit downward movement of the operating member 43 by the spring 45.

Extending through the end wall of the casing 28 in alignment with the path of movement of the operating member 43 is an aperture 47 for receiving the shank of an abutment member 48. As shown, the inner surface of the end wall of the casing 28 is provided with an enlarged recess 49 for receiving a head 50 carried on the shank of the abutment member, and a suitable spring 51 serves to bias the abutment member for movement inwardly through the end wall, such inward movement being limited by an enlarged head 52 on the abutment member. As shown, the outer surface of the end wall of the casing is recessed, as indicated by the reference numeral 53, so that the head 52 of the abutment member when in the position shown in the drawing, is flush with the end of the casing 28. Disposed within the compartment 32a, and adapted to engage opposed surfaces of the head 44 of the operating member 43 and the head 50 of the abutment member 48, is a weight or ball 54 having a diameter such that when disposed between the two slidable members 43 and 48, the ball functions to maintain the operating member 43 in a position wherein the movable contact 34 is out of engagement with the stationary contact 33. The spring 51 on the abutment member 48 is of greater strength than the biasing spring 45 for the operating member 43, and consequently the parts will normally occupy the positions shown in Fig. 1.

The weight of the ball 54 and the forces of the springs 45 and 51 are so proportioned that when a shock of sufficient magnitude having any substantial lateral component is imparted to the flashlight, the ball 54, by the reason of its inertia, will be displaced from between the members 43 and 48 to permit inward movement of the operating member 43 with respect to the compartment 32a and the closure of the contacts 33 and 34 to complete an energizing circuit to the bulb of the flashlight.

In order to effect resetting of the ball 54 between the members 43 and 48, the inner surface 55 of the end wall of the casing 28 is tapered toward the recess 49, and it will be apparent that when the extending head 52 of the abutment member 48 is manually pulled outwardly so as to withdraw the head 50 of the abutment member into the recess 49, the ball will roll down the sloping surface 55 and center itself in the recess 49. To insure proper centering of the ball in the recess, suitable grooves 56 and 57 are provided which extend laterally outward, as shown, on opposite sides of the recess 49.

After the ball 54 has centered itself in the recess 49, the abutment member may be released so as to raise the ball into engagement with the head 44 of the operating member 43 and return the operating member to the position shown in Fig. 1, thereby opening the contacts 33 and 34. To provide stability of the ball 54 during the resetting operation, the head 50 of the abutment member 48 is provided on its upper surface with a recess or dimple 58, as shown in Fig. 3.

The casing 28 is provided with a small aperture 59 in one side wall thereof through which a suitable probe or rod, such as indicated at 60 in Fig. 1, may be inserted to engage the ball 54 and forcibly eject it from its position between the members 43 and 48. This provides for manual operation of the inertia responsive means whenever desired for testing or other purposes. Measurement of the force required to displace the ball 54 from its seat in this manner provides an accurate check upon the calibration of the device as regards the magnitude of inertia forces required to operate it.

In assembling the inertia responsive device, the abutment member 48 is first inserted through the aperture 47 in the end wall of the casing 28, and the spring 51 and the head 50 assembled on the shank of the abutment member 48, the head 50 preferably being secured to the shank by rivets (not shown) and the ball 54 is then placed in the chamber 33. Thereafter the operating member 43 with its biasing spring 45 is assembled on the wall 30 and the contacts 33 and 34, together with the spring finger 36, secured to the wall. The subassembly thus achieved may then be inserted within the casing 28 so that the wall 30 rests on the shoulder 31 and the insulating sleeve 40, which is in the form of a flexible strip adapted to be bent to the proper curvature, may be located within the casing 28, as shown, whereupon the spacing ring 38 and the supporting disk 39 may be dropped into position. Assembly of the inertia responsive means on the flashlight is then completed merely by screwing the casing 28 onto the open-threaded end of the flashlight so as to confine the spring 17, and it will be noted that the spring securely maintains the wall 30, the spacing ring 38, and the disk 39 in position within the casing 28.

It will thus be apparent that this invention provides an inertia responsive device which is of rugged and simple construction and in which the contact means are normally held in open position, the inertia responsive device being automatically effective by movement of the ball 54 to close the contacts whenever a shock of sufficient magnitude is encountered. Resetting of the device is quickly and simply accomplished merely by holding the flashlight in a vertical position and momentarily withdrawing the abutment member to permit the ball 54 properly to center itself for return to the normal position, shown in the drawing.

As previously indicated, inertia control devices embodying this invention are not limited to use with flashlights, but are capable of general application and may be employed with or in various devices wherein it is desired to effect a predetermined control function, such, for example, as the opening or closing of one or more pairs of contacts or actuation of other control members, in response to shocks created by accelerations or decelerations of predetermined magnitude or to other inertia forces.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

Having thus described our invention, what we claim and desire to secure by Letters Patent is:

1. An inertia responsive control device comprising a casing having aligned apertures in opposed walls thereof, a control member disposed in one of said apertures for sliding movement between an inner position and through a range of outwardly displaced positions, means resiliently biasing said control member toward said inner position, an abutment member disposed in the other of said apertures for sliding movement between inner and outer positions, resilient means biasing said abutment member toward its said inner position, and a spherical element disposed between opposed surfaces of said members for holding said control member in an outwardly displaced position short of its outermost position, said biasing means for said abutment member being stronger than said biasing means for said control member whereby said abutment member is normally maintained in its innermost position, said element being normally restrained by the force of said control member biasing means independently of the degree of strength of said abutment member biasing means against movement from between said members and being displaceable by inertia forces to permit movement of said control member toward its inner position, said abutment member being manually movable to its outer position to effect repositioning of said spherical element between said members.

2. An inertia responsive control device comprising a casing having aligned apertures in opposed walls thereof, a control member disposed in one of said apertures for sliding movement between an inner position and through a range of outwardly displaced positions, means resiliently biasing said control member toward said inner position, an abutment member disposed in the other of said apertures for sliding movement between inner and outer positions, resilient means biasing said abutment member toward its said inner position, and a spherical element disposed between opposed surfaces of said members for holding said control member in an outwardly displaced position short of its outermost position, said biasing means for said abutment member being stronger than said biasing means for said control member whereby said abutment member is normally maintained in its innermost position, said element being normally restrained by the force of said control member biasing means independently of the degree of strength of said abutment member biasing means against movement from between said members and being displaceable by inertia forces to permit movement of said control member toward its inner position, said wall in which said abutment member is disposed having its inner surface tapered toward said aperture therein, said abutment member being manually movable to its outer position to permit said spherical element after displacement to center itself over said aperture in said tapered surface, whereby subsequent movement of said abutment member to its inner position is effective to reposition said spherical element between said members and to return said control member to its said outwardly displaced position short of its outermost position.

3. An inertia responsive control device comprising a casing having aligned apertures in opposed walls thereof, a control member disposed in one of said apertures for sliding movement between an inner position and through a range of outwardly displaced positions, means resiliently biasing said control member toward said inner position, an abutment member disposed in the other of said apertures for sliding movement between inner and outer positions, resilient means biasing said abutment member toward its said inner position, and a spherical element disposed between opposed surfaces of said members for holding said control member in an outwardly displaced position short of its outermost position, said biasing means for said abutment member being stronger than said biasing means for said control member whereby said abutment member is normally maintained in its innermost position, said element being normally restrained by the force of said control member biasing means independently of the degree of strength of said abutment member biasing means against movement from between said members and being displaceable by inertia forces to permit movement of said control member toward its inner position, said abutment member being manually movable to its outer position to effect repositioning of said spherical element between said members, and said casing having an aperture therein in alignment with said spherical element transversely of said control and abutment members, whereby said element may be manually displaced from between said members by lateral pressure applied thereto by means inserted through said last-mentioned aperture and whereby the calibration of the device as regards the magnitude of inertia forces required to operate it may be checked by measurement of the magnitude of such lateral pressure.

WILLIAM C. MENTZER.
GORDON G. ANDERSON.

REFERENCES CITED

The following references are of record in the file of this patent:

UNITED STATES PATENTS

| Number | Name | Date |
|---|---|---|
| 2,016,819 | Meginniss | Oct. 8, 1935 |

FOREIGN PATENTS

| Number | Country | Date |
|---|---|---|
| 355,475 | Italy | Jan. 7, 1938 |
| 790,543 | France | Sept. 9, 1935 |